6654X
J. Wood,
Casting Rolls.
Patented July 20, 1831.
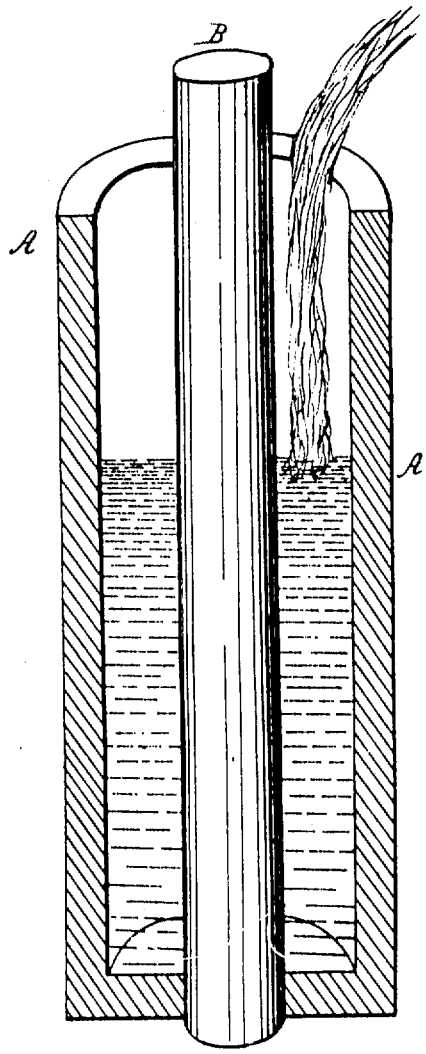

James Wood
Letters Patent

The Schedule referred to in these Letters Patent
and making part of the same containing a description
in the words of the said James Wood himself of
his improvement in the mode of manufacturing rol-
lers of cast iron for laminating or flattening Metals
& for other purposes To all whom it may concern — —

Be it known that I James Wood have invented
a new & improved mode of Manufacturing rollers of
cast iron for laminating or flattening metals & for
other purposes and that the following is a full & exact
description of my said invention —

I make a shaft of cast or wrought iron or of steel
or combinations thereof, upon and around this shaft
I afterwards cast iron so as to form the intended
cylinder or flattening Mill roller of the size and
adapted to the purpose intended. This casting I
sometimes effect in one operation and at other
times I complete it in successive operations. the
final casting by which the surface of the roller is form-
ed is usually made in a chill or mould of cast or
wrought iron turned perfectly true and so con-
structed as to receive and retain the shaft first
named exactly in its centre. The roller so cast,
either chilled or not may afterwards be dressed by
grinding in the usual way and the gudgeons if
necessary may be turned. Such rollers may have
grooves of various forms made in them by prepar-
ing the chill or iron mould with such projecting
rims or ridges as may be required. What I claim
as Drawing Made as new & for which I ask a patent is the casting of iron rollers either chilled or not chilled, for flattening or rolling metals or other substances upon shafts of steel wrought or cast iron or combinations thereof)

Witnesses
Ph. Christian
J Patton jr.

James Wood

Ent.
Rec.

315 wds